United States Patent
Clark (10) Patent No.: US 10,875,321 B2
(45) Date of Patent: Dec. 29, 2020

(54) FLUID EJECTION DEVICES TO DISPENSE FLUID OF DIFFERENT SIZES

(71) Applicant: HEWLETT-PACKARD DEVELOPMENT COMPANY, L.P., Spring, TX (US)

(72) Inventor: Garrett E Clark, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/343,155

(22) PCT Filed: Jan. 23, 2017

(86) PCT No.: PCT/US2017/014572
§ 371 (c)(1),
(2) Date: Apr. 18, 2019

(87) PCT Pub. No.: WO2018/136099
PCT Pub. Date: Jul. 26, 2018

(65) Prior Publication Data
US 2019/0329566 A1   Oct. 31, 2019

(51) Int. Cl.
*B41J 2/21* (2006.01)
*B33Y 30/00* (2015.01)
(Continued)

(52) U.S. Cl.
CPC ........... *B41J 2/2125* (2013.01); *B29C 64/209* (2017.08); *B29C 64/336* (2017.08); *B33Y 30/00* (2014.12);
(Continued)

(58) Field of Classification Search
CPC ...... B41J 2/2125; B41J 2/14201; B41J 2/155; B41J 2202/21; B41J 2202/20; B41J 2/14016; B33Y 30/00; B33Y 40/00; B29C 64/209; B29C 64/336; B29C 64/112; B29C 64/165
See application file for complete search history.

(56) References Cited

U.S. PATENT DOCUMENTS

| 4,746,935 A | 5/1988 | Allen |
| 6,092,887 A | 7/2000 | Tanino |
(Continued)

FOREIGN PATENT DOCUMENTS

| EP | 2064066 | 3/2008 |
| JP | S63502261 | 9/1988 |
(Continued)

OTHER PUBLICATIONS

IP.com search (Year: 2020).*

*Primary Examiner* — Lisa Solomon
(74) *Attorney, Agent, or Firm* — Trop Pruner & Hu PC (57) ABSTRACT

In some examples, a fluid ejection device includes a support body, a multi-die assembly, and a fluid channel that extends through the support body from a first side to a second side adjacent the multi-die assembly. The multi-die assembly includes a plurality of fluid ejection dies to receive fluid from the fluid channel, where a first fluid ejection die of the plurality of fluid ejection dies is to dispense fluid of a first drop size, and a second fluid ejection die of the plurality of fluid ejection dies is to dispense fluid of a second drop size different from the first drop size.

19 Claims, 4 Drawing Sheets

(51) Int. Cl.
*B33Y 40/00* (2020.01)
*B29C 64/209* (2017.01)
*B29C 64/336* (2017.01)
*B41J 2/14* (2006.01)
*B41J 2/155* (2006.01)

(52) U.S. Cl.
CPC ........... *B33Y 40/00* (2014.12); *B41J 2/14201* (2013.01); *B41J 2/155* (2013.01); *B41J 2202/21* (2013.01)

(56) References Cited

U.S. PATENT DOCUMENTS

| | | | |
|---|---|---|---|
| 6,435,653 | B1 | 8/2002 | Boyd et al. |
| 6,634,732 | B2 | 10/2003 | Farr et al. |
| 6,705,699 | B2 | 3/2004 | Du et al. |
| 6,830,317 | B2 | 12/2004 | Tsuchii |
| 7,770,997 | B2 | 8/2010 | Richard et al. |
| 8,007,074 | B2 * | 8/2011 | Fujii ................ B41J 2/1404 347/47 |
| 8,177,329 | B2 | 5/2012 | Matsumoto et al. |
| 8,363,281 | B2 | 1/2013 | Neese |
| 8,419,152 | B2 | 4/2013 | Edamura |
| 8,500,265 | B2 | 8/2013 | Yamakami |
| 9,944,080 | B2 | 4/2018 | Chen et al. |
| 2003/0103105 | A1 | 6/2003 | Kawamura |
| 2009/0244152 | A1 | 10/2009 | Ishizaki |
| 2015/0079214 | A1 | 3/2015 | Shi |
| 2015/0183163 | A1 | 7/2015 | Beak |
| 2016/0001551 | A1 | 1/2016 | Chen et al. |
| 2016/0009086 | A1 | 1/2016 | Choy et al. |
| 2016/0096366 | A1 | 4/2016 | Chen et al. |

FOREIGN PATENT DOCUMENTS

| | | |
|---|---|---|
| JP | 10278243 | 10/1998 |
| JP | 2004122757 | 4/2004 |
| JP | 2006103034 | 4/2006 |
| JP | 2007216415 | 8/2007 |
| JP | 2008149601 | 7/2008 |
| JP | 2009166257 | 7/2009 |
| JP | 2010046903 | 3/2010 |
| JP | 2011025686 | 2/2011 |
| JP | 2016107420 | 6/2016 |
| RU | 2363589 | 8/2009 |
| RU | 2373066 | 11/2009 |
| WO | WO-2010150346 | 12/2010 |

* cited by examiner

FLUID EJECTION DEVICES TO DISPENSE FLUID OF DIFFERENT SIZES

BACKGROUND

A printing system can include a printhead that has nozzles to dispense printing fluid to a print target. In a two-dimensional (2D) printing system, the target is a print medium, such as a paper or another type of substrate onto which print images can be formed. Examples of 2D printing systems include inkjet printing systems that are able to dispense droplets of inks. In a three-dimensional (3D) printing system, the target can be a layer or multiple layers of build material deposited to form a 3D object.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A printhead for use in a printing system can include nozzles that are activated to cause printing fluid droplets to be ejected from respective nozzles. Each nozzle includes an active ejection element that when activated causes ejection of a droplet of the printing fluid from an ejection chamber in the nozzle. A printing system can be a two-dimensional (2D) or three-dimensional (3D) printing system. A 2D printing system dispenses printing fluid, such as ink, to form images on print media, such as paper media or other types of print media. A 3D printing system forms a 3D object by depositing successive layers of build material. Printing fluids dispensed by the 3D printing system can include ink, as well as fluids used to fuse powders of a layer of build material, detail a layer of build material (such as by defining edges or shapes of the layer of build material), and so forth.

In the ensuing discussion, the term "printhead" can refer generally to an overall assembly that includes multiple printhead dies mounted on a support body, wherein the printhead dies are used to dispense printing fluid towards a target. A printhead can be part a print cartridge that can be removably mounted in a printing system. In other examples, a printhead can be part of a print bar, which can have a width that spans the width of a print target, such as a 2D print medium or a 3D object. In a print bar, the multiple dies of the printhead can be arranged along the width of the print bar. In further examples, a printhead can be mounted on a carriage of a printing system, where the carriage is moveable with respect to a print target.

Although reference is made to a printhead for use in a printing system in some examples, it is noted that techniques or mechanisms of the present disclosure are applicable to other types of fluid ejection devices used in non-printing applications that are able to dispense fluids through nozzles. Examples of such other types of fluid ejection devices include those used in fluid sensing systems, medical systems, vehicles, fluid flow control systems, and so forth.

In some examples, a printing system is able to produce printing fluids of different drop sizes. A drop size of a printing fluid can refer to an amount of a printing fluid that is ejected by a nozzle in response to a single activation of the nozzle. In some cases, a drop size can also be referred to as a drop weight. A drop weight is proportional to a drop volume of a printing fluid. In the present disclosure, reference to a "drop size" can be a reference to a drop weight, a drop volume, or any other representation of an amount of printing fluid that is ejected by a single activation of a nozzle. In 2D printing systems, nozzles that produce fluid droplets of a smaller drop size can be useful for forming regions of an image where dot visibility is a priority, such as in photographs. In contrast, nozzles that produce fluid droplets of a larger drop size can more efficiently be used to perform higher density area fills (such as to fill a relatively large region of the same color), since a larger amount of ink can be dispensed with a lower amount of data bandwidth in the printing system. Dispensing fluid droplets of a larger drop size can also have a smaller thermal impact on a printhead than dispensing fluid droplets of a smaller drop size, since it is more efficient to fill a larger region with fluid droplets of a larger drop size and thus less activation of nozzles would have to be performed.

If nozzles that produce fluids of different drop sizes are formed on a common printhead die, then the nozzles that produce smaller drop sizes would have lower efficiency because these lower drop size nozzles share the same material thicknesses and other characteristics with higher drop size nozzles on the same die. A "die" can refer to a structure that includes a substrate on which is provided nozzles and control circuitry to control ejection of fluid by the nozzles.

Figure 1:
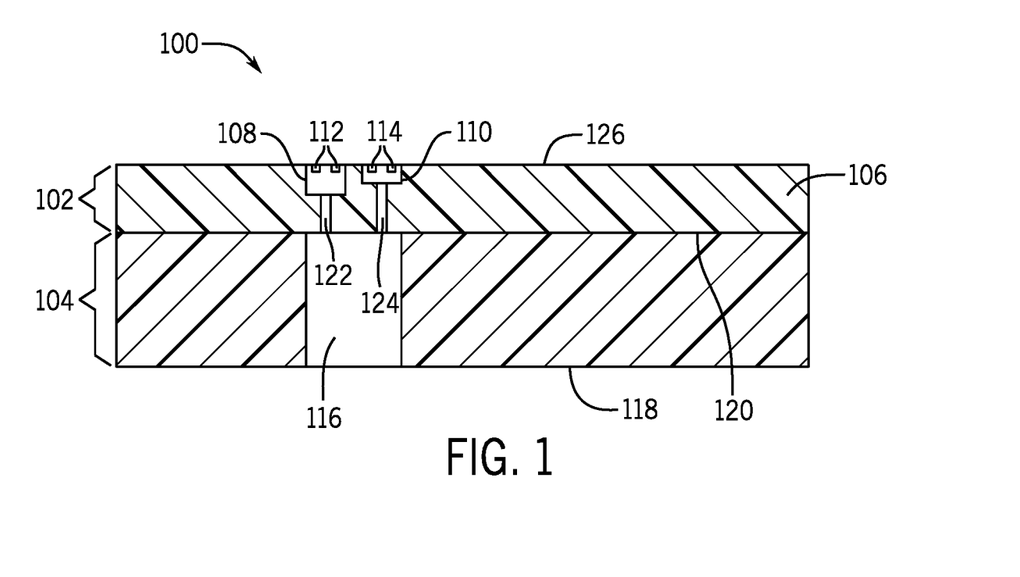
FIG. 1 is a sectional side view of a fluid ejection device that includes a multi-die assembly and a support body according to some examples.

In accordance with some implementations of the present disclosure, instead of forming multi-drop size nozzles on the same die, different fluid ejection dies can be used to provide different drop size nozzles. As shown in FIG. 1, an example fluid ejection device 100 includes a multi-die assembly 102 that is mounted on a support body 104. The fluid ejection device 100 can include a printhead, or can include another type of device for ejecting fluid.

The support body 104 can include a material such as plastic, epoxy, and so forth. In further examples, the support body 104 can be formed of a moldable material, which is a pliable material that can be molded onto another structure, such as the multi-die assembly 102 of FIG. 1.

The multi-die assembly 102 includes a molded body 106 that encapsulates multiple dies 108 and 110. The molded body 106 can be formed of a moldable material such as plastic, an epoxy, or any other moldable material. In some examples, the multi-die assembly 102 and the support body 104 are separate structures that can be attached together. In other examples, the multi-die assembly 102 and the support body 104 can be integral with one another, i.e., they are formed as a single piece, such as by using an injection molding process.

Although specific examples are listed above for materials of the support body 104 and the body 106, it is noted that the support body 104 and the body 106 can be formed of other materials in other examples. The support body 104 can be formed of any material of sufficient rigidity to support another structure, such as the multi-die assembly 102. The body 106 of the multi-die assembly 102 can be formed of any material (e.g., semiconductor material, electrically insulating material, etc.) that allows for encapsulation of dies within the body 106.

The fluid ejection die 108 includes fluidic arrangements 112 to eject a fluid of a first drop size, while the fluid ejection die 110 includes fluidic arrangements 114 to eject a fluid of a second drop size. The fluidic arrangements 112 and 114 include nozzles, where a nozzle can include a fluid ejection chamber to temporarily hold a fluid that is to be ejected by the nozzle, an orifice through which the fluid is ejected when the nozzle is activated, and an active ejection element.

Note that the orientation of the fluid ejection device 100 shown in FIG. 1 is upside-down from the orientation of the fluid ejection device 100 during actual use, since ejected fluids would be ejected downwardly. However, the fluid ejection device 100 can have other orientations during use in other examples.

Activation of a nozzle is controlled by the active ejection element associated with the nozzle. An example of an active ejection element includes a thermal resistor formed using an electrically resistive layer that is part of the die 108 or 110. An electrical current that is passed through the resistive layer causes the resistive layer to produce heat that vaporizes a fluid in the ejection chamber. The vaporization of the fluid in the ejection chamber causes expulsion of a droplet of fluid through the corresponding orifice.

In other examples, an active ejection element of a nozzle can include a piezoelectric element, which responds to input electric energy (electrical voltage or current) by moving to propel a fluid droplet from an ejection chamber of the nozzle.

In some examples, the fluid ejection dies 108 and 110 are die slivers. A die sliver includes a thin silicon, glass or other substrate (e.g., having a thickness on the order of 650 μm (micrometers) or less) with a ratio of length to width (L/W) of at least three. A die sliver can have other example dimensions in other examples. Continuous fluid slots may not be formed through the die sliver substrate. Instead, each die sliver may contain multiple smaller fluid supply ports and is molded into a monolithic molded body (106) that provides fluid from a fluid channel.

FIG. 1 also shows a fluid channel 116 that extends through a thickness of the support body 104, from a first side 118 of the support body to a second side 120 of the support body 104. The second side 120 is opposite the first side 118 on the support body 104. A first side is opposite a second side on the support body 104 if the first side faces in a first direction away from the support body 104, and the second side faces in a second direction away from the support body 104, where the second direction is opposite the first direction. The fluid channel 116 receives fluid from a fluid reservoir (not shown) through the first side 118 of the support body 104. This fluid travels through the fluid channel 116 from the first side 118 to the second side 120.

The multi-die assembly 102 includes fluid feed slots 122 and 124 that are both in fluid communication with the fluid channel 116. The fluid feed slot 122 extends from the second side 120 of the support body 104 to the fluid ejection die 108, and the fluid feed slot 124 extends from the second side 120 of the support body 104 to the fluid ejection die 110.

As depicted in FIG. 1, a common fluid channel 116 feeds fluid to each of the fluid ejection dies 108 and 110 through respective fluid feed slots 122 and 124. The ability to use a common fluid channel 116 to feed fluid ejection dies that dispense fluids of different drop sizes enhances the efficiency in the manufacture of the fluid ejection device 100, since more efficient usage of the space of the fluid ejection device 100 can be accomplished by using one fluid channel to feed multiple fluid ejection dies, as compared to an arrangement in which separate fluid channels are used to feed fluid ejection dies or different drop sizes.

Although FIG. 1 shows two fluid ejection dies 108 and 110 that are fed from a common fluid channel 116, it is noted that in other examples, more than two fluid ejection dies for producing respective fluids of different drop sizes can be fed using a common fluid channel. By using different fluid ejection dies for different drop sizes, characteristics of the different fluid ejection dies and characteristics of the fluidic arrangements of the different fluid ejection dies can be made to be different, for more efficient production of fluids of different drop sizes.

For example, the overall thickness of the fluid ejection die 108 can be greater than the overall thickness of the fluid ejection die 110. In other examples, other characteristics of the fluid ejection dies 108 and 110 can be made different, as explained further below.

As further shown in FIG. 1, in some examples, top surfaces of the fluid ejection dies 108 and 110 are planar (or substantially planar) with the top surface 126 of the molded body 106 of the multi-die assembly 102. The top surfaces of the fluid ejection dies 108 and 110 are "substantially planar" with the top surface 126 of the molded body 106 in that these surfaces are planar to within manufacturing tolerances.

Figure 2:
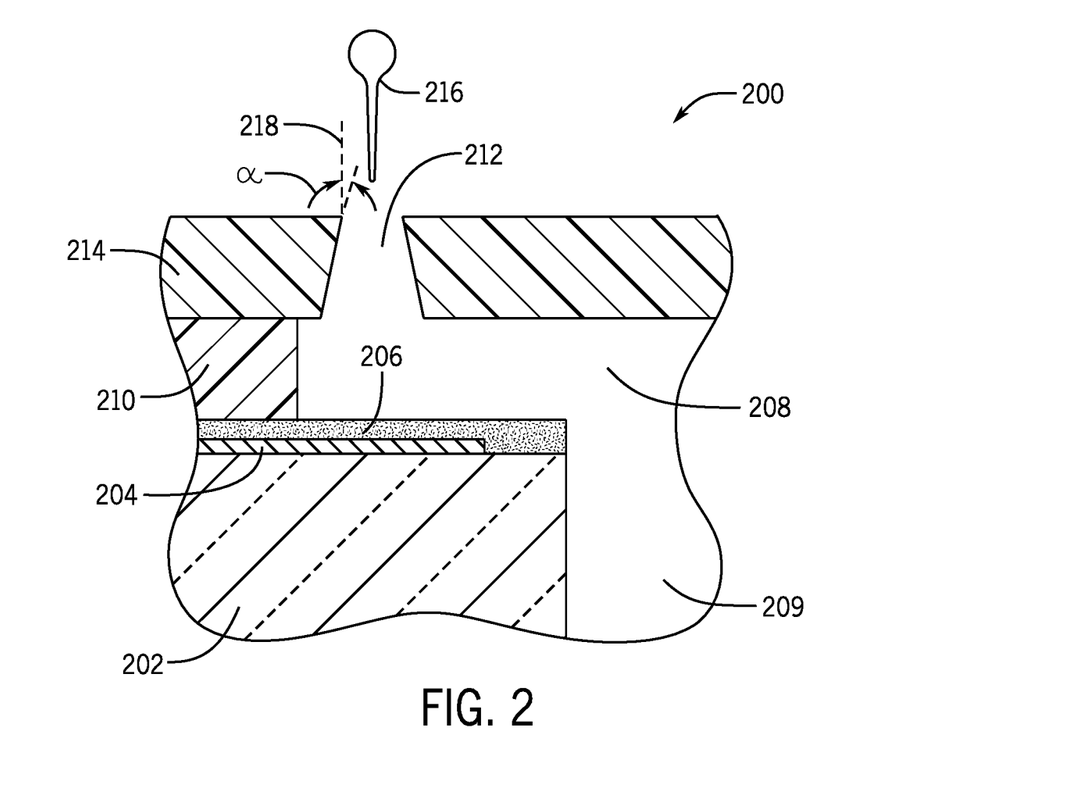
FIG. 2 is a sectional view of a fluid ejection die according to some examples.

FIG. 2 shows a portion of an example fluid ejection die 200, such as the fluid ejection die 108 or 110 of FIG. 1. The fluid ejection die 200 includes various layers. Although a specific arrangement of layers is shown in FIG. 2, it is noted that fluid ejection dies can have other arrangements in other examples.

In the ensuing discussion, reference is made to one layer being formed over another layer. Note that during use, the fluid ejection die 200 can be upside-down from the orientation shown in FIG. 2, such that the term "above" or "on" can actually refer one layer being below another layer in the different orientation, and vice versa. The orientation shown in FIG. 2 can be the orientation of the fluid ejection die 200 during manufacturing of the fluid ejection die 200, as the layers of the fluid ejection die 200 are formed.

The fluid ejection die 200 includes a substrate 202, which can be formed of silicon, another semiconductor material, or another type of material. An electrically resistive layer 204 is formed over the substrate 202, and an overcoat layer 206 is provided over the resistive layer 204. The overcoat layer provides protection for the resistive layer 204.

The overcoat layer 206 can include an electrically insulating layer (referred to as a passivation layer) to electrically isolate the resistive layer 204 from fluid in an ejection chamber 208. Examples of an electrically insulating layer can include silicon carbide, silicon nitride, hafnium oxide, or any other electrically insulating material. The overcoat layer 206 can also include a layer to provide mechanical strength, which can include tantalum or another metal.

The fluid ejection chamber 208 is defined by a chamber layer 210 formed over the overcoat layer 206. Fluid flows from a channel 209 to the fluid ejection chamber 208. For example, fluid that enters the channel 209 can be from the fluid feed slot 122 or 124 shown in FIG. 1. The chamber layer 210 can be formed of an epoxy, another polymer, or any other material.

An orifice 212 leads form the fluid ejection chamber 208 to the outside of the fluid ejection die 200. The orifice 212 is defined by an orifice layer 214, which can be formed of the same or a different material than the chamber layer 210. In some examples, the chamber layer 210 and the orifice layer 214 are formed as separate layers where one is formed over the other. In other examples, the chamber layer 210 and the orifice layer 214 can be part of a monolithic layer that combines the chamber and orifice layers.

As seen in FIG. 2, the orifice 212 is tapered, such that the side of the orifice 212 adjacent the fluid ejection chamber 208 is wider than the side of the orifice 212 that faces the outside. The orifice 212 has a taper angle α measured with respect to a vertical axis 218.

In operation, when the resistive layer 204 is activated (by passing an electrical current through the resistive layer 204 to heat up the resistive layer 204), the heat produced by the resistive layer 204 vaporizes the fluid in the fluid ejection chamber 208, which causes a fluid droplet 216 to be ejected from the orifice 212.

The fluidic arrangement of a nozzle that is included as part of the fluid ejection die 200 includes the substrate 202, the resistive layer 204, the overcoat layer 206, the chamber layer 210, the orifice layer 214, the fluid ejection chamber 208, and the orifice 212.

In some implementations, since different fluid ejection dies are used for dispensing fluids of different drop sizes, characteristics of the fluidic arrangement for a smaller drop size fluid ejection die can be set to be different from characteristics of the fluidic arrangement of a larger drop size fluid ejection die during the manufacture of the smaller drop size and larger drop size fluid ejection dies. For example, a nozzle that produces a smaller drop size fluid can have a lower firing energy, such that the resistive layer 204 used for a smaller drop size nozzle can have a higher sheet resistance than a larger drop size nozzle. In examples where the active ejection element is a piezoelectric element, the piezoelectric element of a smaller drop size nozzle can have a different characteristic than the piezoelectric element of a larger drop size nozzle.

In further examples, a smaller drop size nozzle can have an improved thermal resistor life compared to a larger drop size nozzle, and as a result, the tantalum (or other mechanical protective) layer that is part of the overcoat layer 206 can be made to be thinner in the smaller drop size nozzle as compared to a larger drop size nozzle.

In additional examples, a smaller drop size nozzle can use a smaller amount of fluid in the fluid ejection chamber 208; as a result, the thickness of the chamber layer 210 for a smaller drop size nozzle can be less than a thickness of the chamber layer 210 of a larger drop size nozzle. Note that making the chamber layer 210 thinner, and thus making the fluid ejection chamber 208 smaller, and reducing the mass of fluid moving in the chamber 208, enables improved efficiency during fluid ejection operations. More generally, a size of the fluid ejection chamber 208 of a smaller drop size nozzle is smaller than a size of fluid ejection chamber 208 of a larger drop size nozzle.

The smaller drop size nozzle is less likely to gulp air during droplet ejection, which allows for use of an orifice layer 214 that is thinner than an orifice layer of a larger drop size nozzle. In addition, the taper angle of the orifice 212 of a smaller drop size nozzle can be made to be different than the taper angle of a larger drop size nozzle.

Additionally, the thickness of the substrate 202 of a smaller drop size nozzle can be made to be less than the thickness of the substrate 202 of a larger drop size nozzle. Varying the thickness of the substrate 202 can more significantly affect the overall thickness of the fluid ejection die, since the substrate 202 is typically much thicker than the remaining layers used to form of the fluid ejection die.

Although example differences of characteristics of a fluid ejection die with a smaller drop size nozzle and a fluid ejection die with a larger drop size nozzle are listed above, it is noted that there can be additional or alternative differences in characteristics in other examples.

By being able to individually control various characteristics of elements of the a smaller drop size fluid ejection die and of a larger drop size fluid ejection die, more efficient fluid ejection dies can be provided in a fluid ejection device for producing fluids of different drop sizes.

Figure 3:
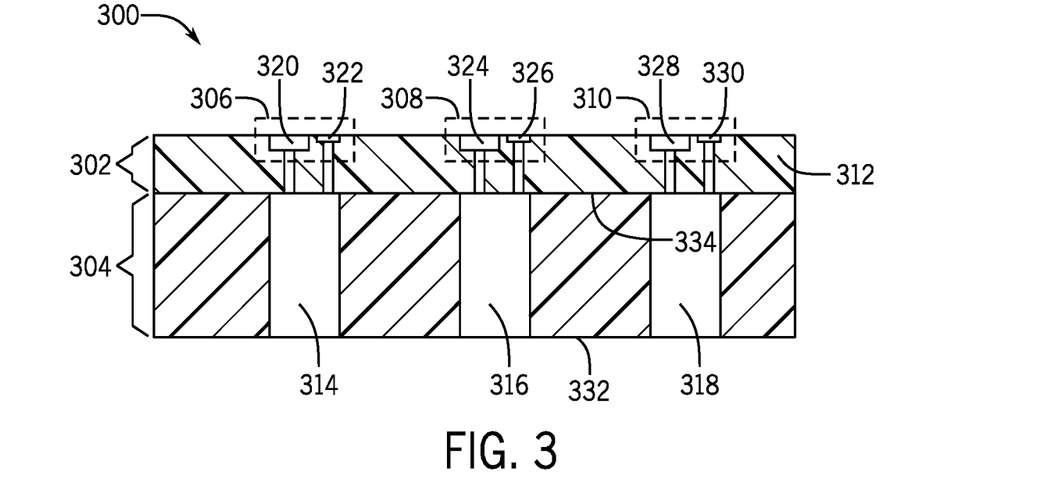
FIGS. 3 and 4 are sectional side views of fluid ejection devices according to further examples.

FIG. 3 illustrates another example fluid ejection device 300 that includes an arrangement 302 of multiple multi-drop size fluid ejection assemblies 306, 308, and 310, where the arrangement 302 is supported by a support body 304. Although three multi-drop size fluid ejection assemblies 306, 308, and 310 are depicted in FIG. 3, it is noted that in other examples, the fluid ejection device 300 can include just two multi-drop size fluid ejection assemblies or more than three multi-drop size fluid ejection assemblies.

The arrangement 302 can include a molded body 312 that encapsulates the multiple fluid ejection assemblies 306, 308, and 310. Each of the fluid ejection assemblies 306, 308, and 310 is able to receive fluid from a respective common fluid channel 314, 316, or 318, respectively. The fluid channels 314, 316, and 318 each extends from a first side 332 of the support body 304 to a second side 334 of the support body 304, where the second side 334 is opposite the first side 332 of the support body 304.

In some examples, the different fluid channels can be used to carry different types of fluids. For example, the fluid channels 314, 316, and 318 can be used to carry inks of different colors. In other examples, the fluid channels 314, 316, and 318 can be used to carry other types of fluids, such as agents used during a 3D printing process.

As shown in FIG. 3, the multi-drop size fluid ejection assembly 306 includes a fluid ejection die 320 to dispense fluid of a first drop size, and a fluid ejection die 322 to dispense fluid of a second fluid drop size that is smaller than the first drop size. Similarly, the multi-drop size fluid ejection assembly 308 includes fluid ejection dies 324 and 326 to dispense fluids of respective different drop sizes, and the multi-drop size fluid ejection assembly 310 includes fluid ejection dies 328 and 330 to dispense fluids of respective different drop sizes.

Fluid in the fluid channel 314 is transferred through fluid feed slots in the molded body 312 to the respective fluid ejection dies 320 and 322, fluid from the fluid channel 316 is transferred through respective fluid feed slots in the molded body 312 to the corresponding fluid ejection dies 324 and 326, and fluid in the fluid channel 318 is transferred through respective fluid feed slots in the molded body 312 to the corresponding fluid ejection dies 328 and 330.

Figure 4:
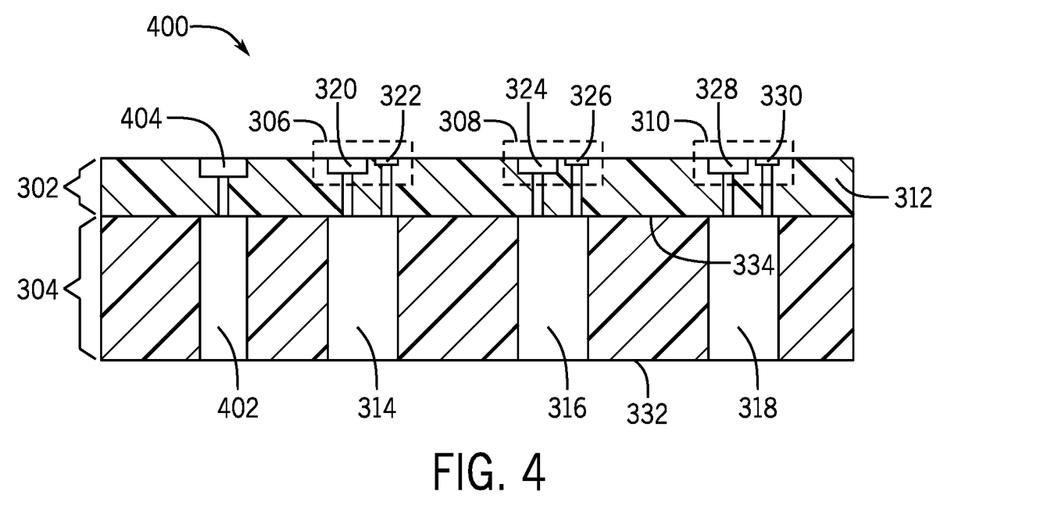

FIG. 4 illustrates a fluid ejection device 400 according to further examples. Elements in the fluid ejection device 400 that are similar to the corresponding elements of the fluid ejection device 300 of FIG. 3 are assigned the same reference numerals.

In the fluid ejection device 400, an additional fluid channel 402 extends from the first side 332 of the support body 304 to the second side 334 of the support body 304. The fluid in the fluid channel 402 extends through a single fluid feed slot in the molded body 312 to a single fluid ejection die 404. Thus, the fluid ejection die 404 forms a single drop size die assembly that produces a fluid of only a single drop size, as compared to the multi-drop size fluid ejection assemblies 306, 308, and 310 that are each able to produce fluid drops of different sizes. In some examples, the fluid channel 402 can be used to carry black ink, while the fluid channels 314, 316, and 318 can be used to carry ink of other colors, such as cyan, magenta, and yellow inks.

Figure 5:
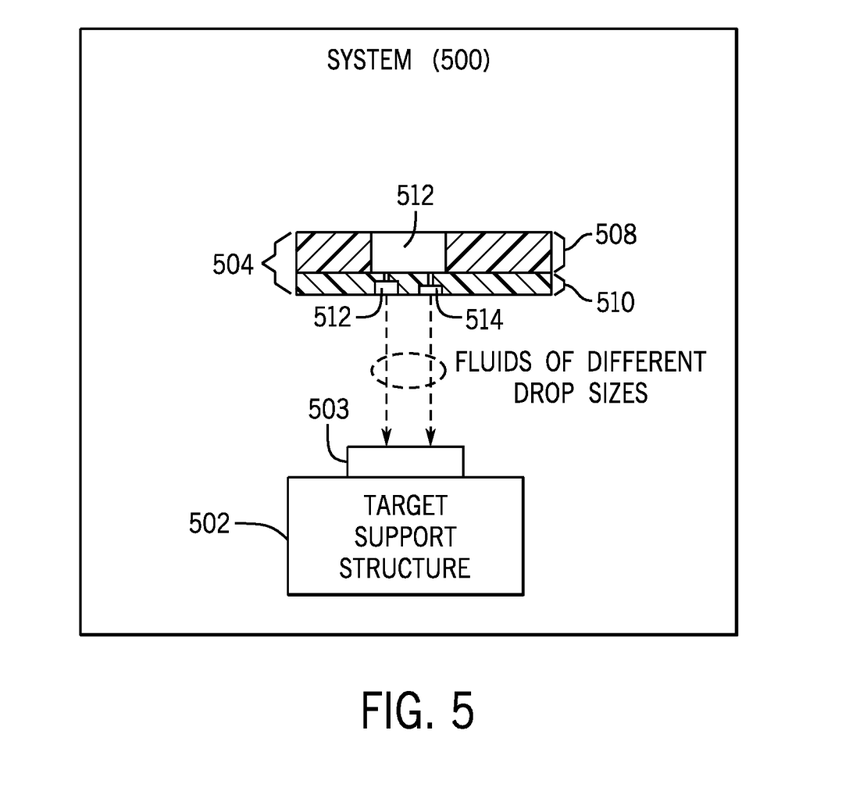
FIG. 5 is a block diagram of a system that includes a fluid ejection device including multi-die assembly for dispensing fluid of different drop sizes, according to some examples.

FIG. 5 is a block diagram of an example system 500, which can be a printing system or another type of system for dispensing fluid. The system 500 includes a target support structure 502 to support a target 503. For example, if the system 500 is a 2D printing system, then the target support structure 502 can support a print medium, such as a paper or other print substrate. Alternatively, if the system 500 is a 3D printing system, then the target support structure 502 can support a 3D object, which can include a stack of layers of build material that have been formed so far during a 3D printing process.

The system 500 further includes a fluid ejection device 504, which is to dispense fluids of different drop sizes onto the target 503. The fluid ejection device 504 can include a support body 508, a multi-die assembly 510 that includes multiple fluid ejection dies 512 and 514 encapsulated in a molded body 514 of the multi-die assembly 510. In addition, the fluid ejection device 504 includes a fluid channel 512 that extends through the support body 508 from a first side to a second, opposite side adjacent the multi-die assembly 510. The multiple fluid ejection dies 512 and 514 receive fluid from the fluid channel 512 through respective fluid feed slots, and to dispense fluids of different drop sizes.

Figure 6:
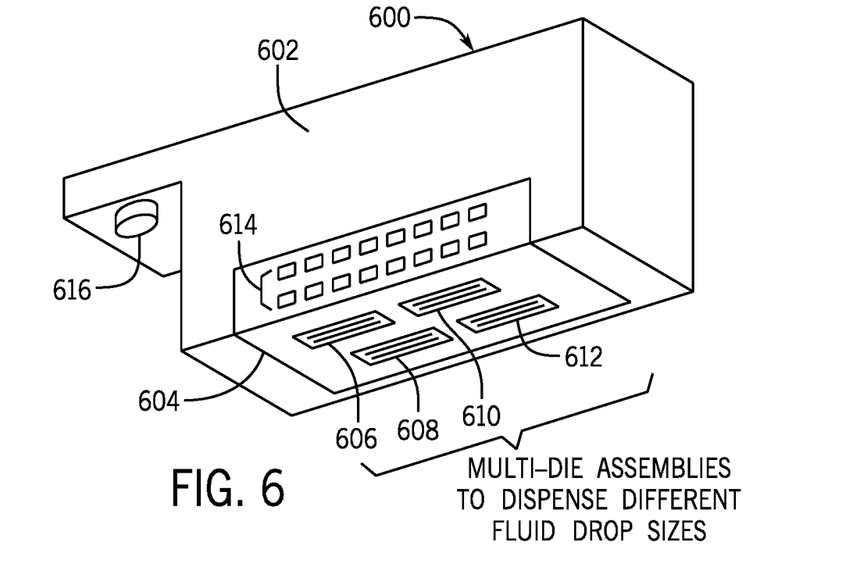
FIG. 6 is a schematic view of a cartridge according to further examples.

A fluid ejection device including a multi-die assembly according to some implementations (as discussed above) can be mounted onto a cartridge 600, as shown in FIG. 6. The cartridge 600 can be a print cartridge, for example, which can be removably mounted in a printing system. In other examples, the cartridge 600 can be another type of fluid ejection cartridge removably mounted in other types of systems.

The cartridge 600 has a housing 602 on which a fluid ejection device 604 can be mounted. For example, the fluid ejection device 604 can include a flex cable or other type of thin circuit board that can be attached to an external surface of the housing 602. The fluid ejection device 604 includes multi-die assemblies 606, 608, and 610, each capable of ejection fluids of different drop sizes, such as the multi-die assemblies 306, 308, and 310 of FIG. 3 or 4. The fluid ejection device 604 can also include a single drop size die assembly 612 (similar to the single drop size die assembly 404 of FIG. 4).

The fluid ejection device 604 further includes electrical contacts 614 to allow the fluid ejection device 604 to make an electrical connection with another device. In some examples, the cartridge 600 includes a fluid inlet port 616 to receive fluid from a fluid supply that is separate from the cartridge 600. In other examples, the cartridge 600 can include a fluid reservoir that can supply fluid to the die assemblies.

Figure 7:
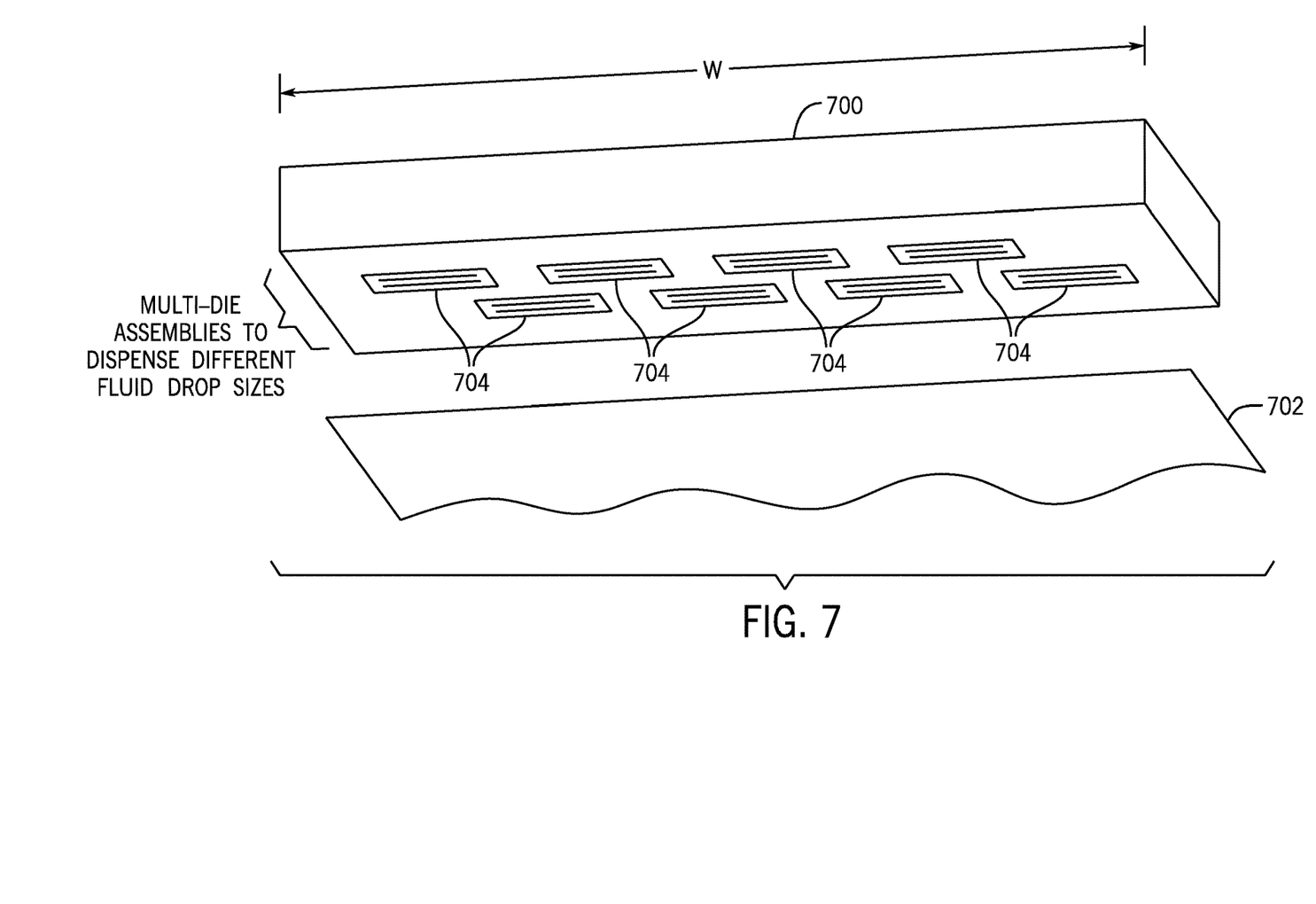
FIG. 7 is a schematic view of a bar according to other examples.

In further examples, a fluid ejection device including a multi-die assembly according to some implementations can be mounted on a bar 700 (e.g., a print bar), such as shown in FIG. 7, where the bar 700 has a width W that allows the bar 700 to cover a width of a target 702 onto which fluids are to be dispensed by fluid ejection die assemblies 704. At least one of the fluid ejection die assemblies 704 includes multiple fluid ejection dies for ejecting fluids of different drop sizes, similar to those discussed further above.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A fluid ejection device comprising:
   a support body;
   a multi-die assembly; and
   a fluid channel that extends through the support body from a first side to a second side adjacent the multi-die assembly,
   wherein the multi-die assembly comprises a plurality of fluid ejection dies and a molded body encapsulating the plurality of fluid ejection dies, the plurality of fluid ejection dies to receive fluid from the fluid channel, wherein a first fluid ejection die of the plurality of fluid ejection dies is to dispense fluid of a first drop size, and a second fluid ejection die of the plurality of fluid ejection dies is to dispense fluid of a second drop size different from the first drop size.

2. The fluid ejection device of claim 1, wherein the first fluid ejection die comprises a first fluidic arrangement, and the second fluid ejection die comprises a second fluidic arrangement different from the first fluidic arrangement, each of the first and second fluidic arrangements comprising a fluid ejection chamber and an active ejection element.

3. The fluid ejection device of claim 2, wherein a size of the fluid ejection chamber of the first fluidic arrangement is different from a size of the fluid ejection chamber of the second fluidic arrangement.

4. The fluid ejection device of claim 2, wherein each of the first and second fluidic arrangements comprises an orifice through which fluid is ejected, and wherein a characteristic of the orifice of the first fluidic arrangement is different from a characteristic of the orifice of the second fluidic arrangement.

5. The fluid ejection device of claim 2, wherein a characteristic of the active ejection element of the first fluidic arrangement is different from a characteristic of the active ejection element of the second fluidic arrangement.

6. The fluid ejection device of claim 5 wherein the active ejection element of each of the first and second fluidic arrangements comprises a thermal resistive layer.

7. The fluid ejection device of claim 6, wherein a sheet resistance of the thermal resistive layer of the first fluidic arrangement is different from a sheet resistance of the thermal resistive layer of the second fluidic arrangement.

8. The fluid ejection device of claim 6, wherein a thickness of a tantalum layer of the first fluidic arrangement is different from a thickness of a tantalum layer of the second fluidic arrangement.

9. The fluid ejection device of claim 5, wherein the active ejection element of each of the first and second fluidic arrangements comprises a piezoelectric element.

10. The fluid ejection device of claim 1, wherein a thickness of the first fluid ejection die is different from a thickness of the second fluid ejection die.

11. The fluid ejection device of claim 10, wherein a thickness of a substrate of the first fluid ejection die is different from a thickness of a substrate of the second fluid ejection die.

12. The fluid ejection device of claim 1, wherein the molded body comprises a plurality of fluid feed slots to transfer fluid from the fluid channel, the plurality of fluid feed slots extending through the molded body to respective fluid ejection dies of the plurality of fluid ejection dies.

13. The fluid ejection device of claim 12, wherein the molded body is attached to the support body.

14. The fluid ejection device of claim 12, wherein the fluid channel is a first fluid channel, the fluid ejection device further comprising:
a second fluid channel extending through the support body; and
a second plurality of fluid ejection dies encapsulated by the molded body and to receive fluid from the second fluid channel, wherein the second plurality of fluid ejection dies are to dispense fluid of respective different drop sizes.

15. The fluid ejection device of claim 12, wherein the fluid channel is a first fluid channel, the fluid ejection device further comprising:
a second fluid channel extending through the support body; and
a single fluid ejection die to receive fluid from the second fluid channel.

16. An apparatus comprising:
a support body comprising a plurality of fluid channels;
a plurality of multi-drop size fluid ejection assemblies supported by the support body; and
a molded body encapsulating the plurality of multi-drop size fluid ejection assemblies,
wherein each respective multi-drop size fluid ejection assembly of the plurality of multi-drop size fluid ejection assemblies is to receive fluid from a respective fluid channel of the plurality of fluid channels and comprises:
a first die having a first thickness to dispense fluid of a first drop size, and
a second die having a second thickness to dispense fluid of a second drop size different from the first drop size, wherein the second thickness is different from the first thickness.

17. The apparatus of claim 16, comprising a print cartridge or a print bar, wherein the support body and the molded body encapsulating the plurality of multi-drop size fluid ejection assemblies are mounted on the print cartridge or the print bar.

18. A system comprising:
a target support structure to support a target;
a fluid ejection device to dispense fluids of different drop sizes onto the target, the fluid ejection device comprising:
a support body;
a multi-die assembly comprising a plurality of fluid ejection dies encapsulated in a molded body; and
a first fluid channel that extends through the support body from a first side to a second side adjacent the multi-die assembly, the second side opposite of the first side on the support body,
wherein the plurality of fluid ejection dies are to receive fluid from the first fluid channel, wherein a first fluid ejection die of the plurality of fluid ejection dies is to dispense fluid of a first drop size, and a second fluid ejection die of the plurality of fluid ejection dies is to dispense fluid of a second drop size different from the first drop size.

19. The system of claim 18, further comprising:
a second fluid channel that extends through the support body from the first side to the second side, wherein the second fluid channel is to carry a different type of fluid than the first fluid channel; and
another multi-die assembly comprising a further plurality of fluid ejection dies to receive the fluid from the second fluid channel, wherein the further plurality of fluid ejection dies are to dispense fluids of respective different drop sizes.

* * * * *